Nov. 20, 1928.

F. F. OVIEDO

1,692,515

AUTOMATIC BAKING OVEN

Filed March 3, 1924   6 Sheets-Sheet 2

Nov. 20, 1928.  
F. F. OVIEDO  
1,692,515  
AUTOMATIC BAKING OVEN  
Filed March 3, 1924 6 Sheets-Sheet 3

Inventor  
F. F. Oviedo  
By Marks & Clerk

Nov. 20, 1928.  1,692,515
F. F. OVIEDO
AUTOMATIC BAKING OVEN
Filed March 3, 1924  6 Sheets-Sheet 4

Nov. 20, 1928.　　　　　　　　　　　　　　　　　1,692,515
F. F. OVIEDO
AUTOMATIC BAKING OVEN
Filed March 3, 1924　　　　　　6 Sheets-Sheet 5

Inventor
F. F. Oviedo
By Marks & Clerk
Attys.

Patented Nov. 20, 1928.

1,692,515

UNITED STATES PATENT OFFICE.

FORTUNATO FERNANDEZ OVIEDO, OF MADRID, SPAIN.

AUTOMATIC BAKING OVEN.

Application filed March 3, 1924, Serial No. 696,659, and in Spain April 11, 1923.

This invention has reference generally to improvements in that class of invention known as bread, pastry and confection baking and more particularly relates to an automatic baking oven.

The invention as its primary aim and object contemplates the provision of an automatic baking oven of the endless carrier type in which improved means is provided for operating the endless carrier within the furnace structure the latter being in turn constructed so that the greatest amount of heat may be obtained with a comparatively low amount of fuel. The invention as an additional object contemplates the provision of improved means for automatically filling the carrier and for automatically emptying the carrier and discharging the cooked loaves of bread therefrom.

Briefly the invention may be said to consist of an oven for baking dough, especially bread, the dough which is ready for baking being placed on interchangeable trays and carried by these trays inside the baking chamber where the hooks moved by the endless carrier arrangement pick up the trays and carry them through the different heat zones of the chamber following a closed circuit and consuming sufficient time to properly bake the bread preparatory to discharging the loaves from the pan.

Among the other aims and objects of this invention may be recited the provision of an apparatus of the above character constructed with a view of compactness wherein the number of parts are comparatively few, the construction simple, the cost of production low and the efficiency high.

Other objects as well as the nature, characteristic features and scope of the invention will be more readily apparent from the following description taken in connection with the drawings and pointed out in the claims forming part of this invention.

The invention is clearly pointed out in the accompanying drawings, in which:—

Fig. 20 is a perspective view of the baking oven of the modified form of endless carrier therein.

Similar characters of reference are employed throughout the several views to indicate corresponding parts.

Figure 1:
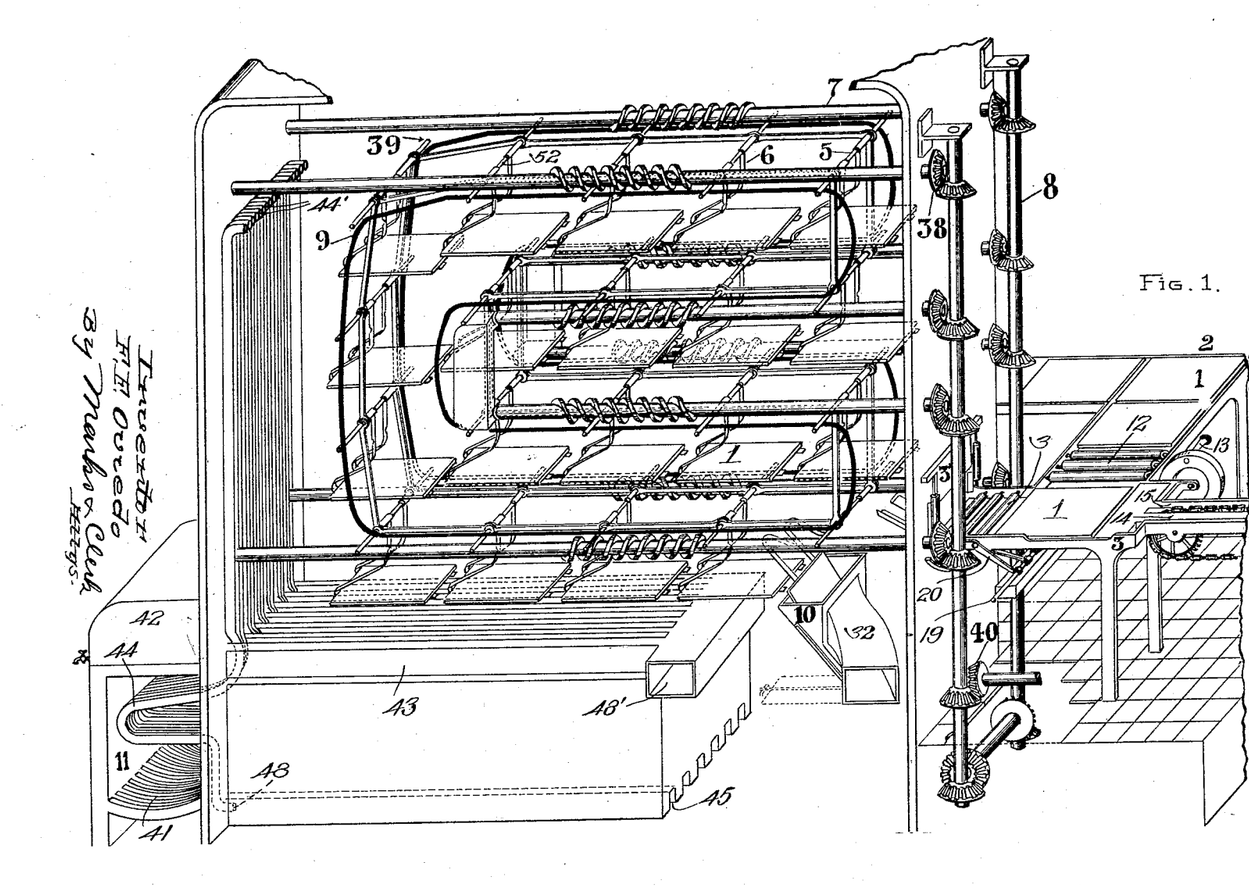
Fig. 1 is a perspective view of an improved automatic baking oven one wall of the chamber being moved to record the construction of the parts maintained therein.

Referring now, more particularly, to the accompanying drawings the numeral 1 shows the trays; 2 the rail along which the dough bearing trays will run; 3 the table for placing the dough inside the oven (hereinafter this will be called the "ovening table") 3′ the door of the oven; 4 the peel; 5 the double endless chain; 6 the supporting hooks; 7 the endless screws which, by reason of their special shape, transmit to the double chain a carrying movement; 8 the axles of the pinions which transmit the revolving motion to the screws; 9 the guiders; 10 the apparatus for taking the bread from the oven (this hereinafter will be called the "disovening apparatus") and finally on the left hand bottom side of the same figure, the heating apparatus 11 is shown.

Figure 2:
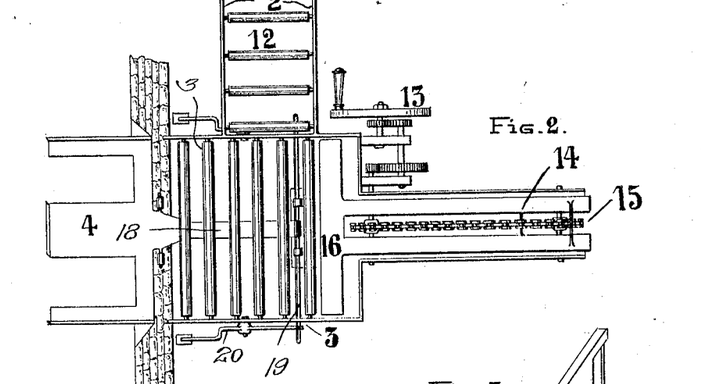
Fig. 2 is a fragmentary top plan detail of the ovening table.
Figure 2A:
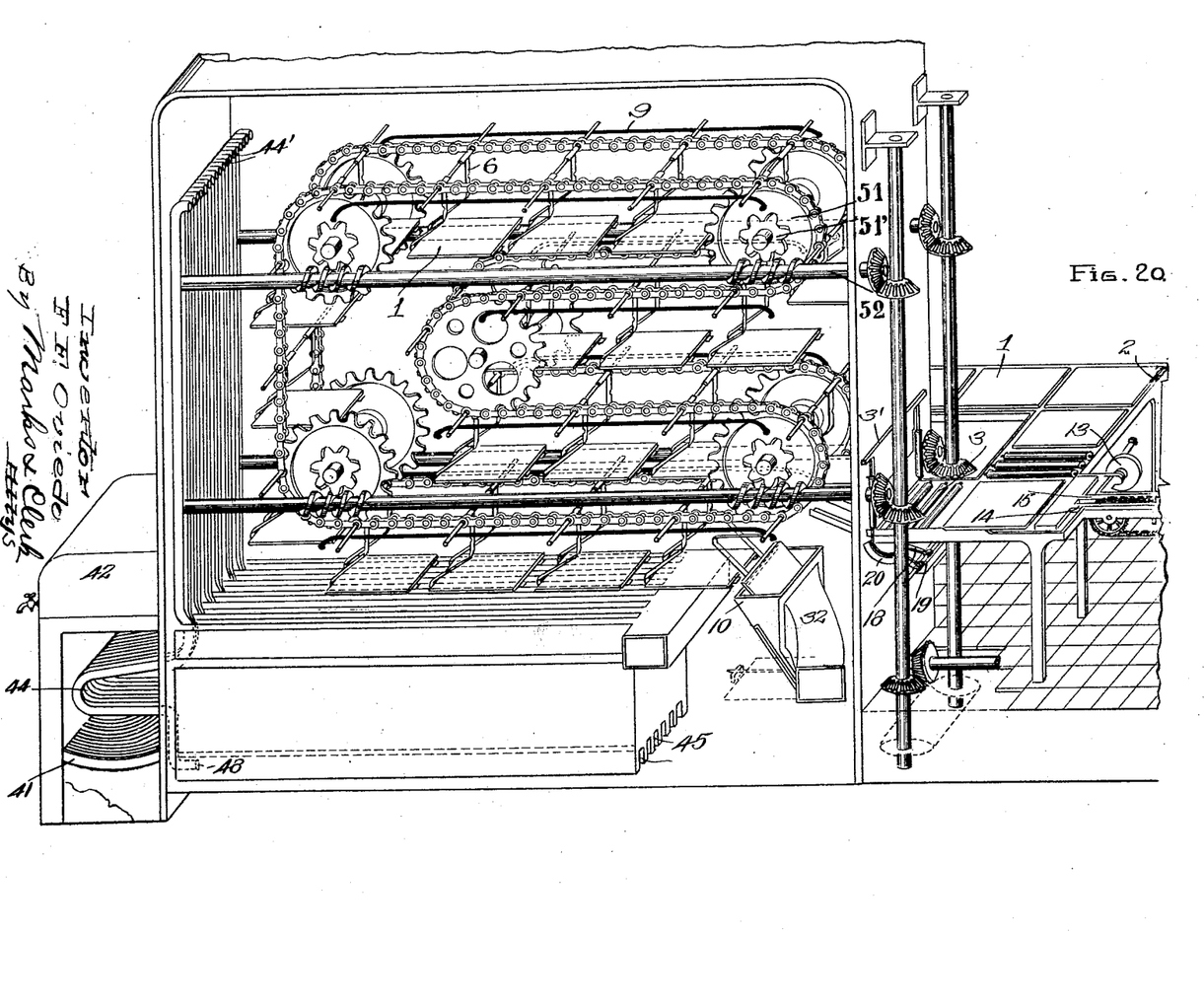
Figure 4:
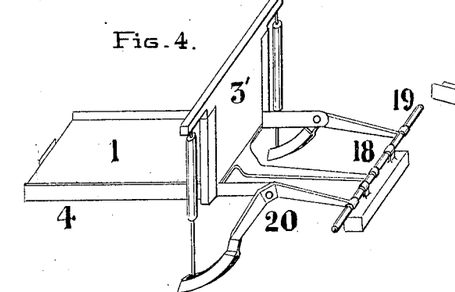
Fig. 4 is a similar view of the same part in a different position.

Upon reference to Fig. 2 it will be noted that 2 shows a part of the rail coming from the kneading place. This rail is provided with rollers 12 suitably spaced one from the other so that the trays will always rest on at least two of them. 13 shows a handle with a set of pinions necessary for operating the endless chain. One of the pins 14 of this endless chain is extended and anchored in the longitudinal bearers 15 of the piece 16 which hereinafter will be called "pusher", the object of which is to push the trays placed on the ovening table 3 from said table to the peel 4. This peel has the shape of a three pronged fork with appropriate ledges into which the trays fit. The slipping along of these trays is helped by the top of the said table which is formed by a set of rollers parallel to the under side of the rectangle formed by the mouth or opening of the baking chamber in the wall of which the table ends. Peel 4 now comes into play. This, in addition to the features already pointed out, has that of having its central part fastened to the wall with hinges on which it can swing. Stem 18 (Fig. 4) of the peel starts from these hinges and immediately bends and totally remains underneath the rollers of the table 3.

Figure 3:
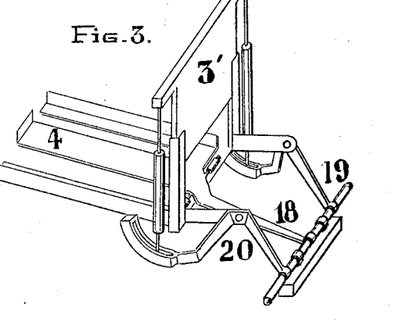
Fig. 3 is a perspective detail of the peel and the oven door.

In Fig. 3 it will clearly be seen that by hanging a certain weight on bar 19 in which stem 18 ends, the peel will assume an inclined position. At the same time door 3 of the chamber will be raised, impulsed by the arms of lever 20 as these are hooked at one end to bar 19 and at the other end form a semi-circular walled box in which will run the little wheels fastened to the extremities of the uprights on which door 3 rests, but as soon as a tray is placed on the peel the latter will descend until it becomes horizontal and, naturally, the door will follow the same movement and therefore close the chamber, Fig. 4.

Figure 5:
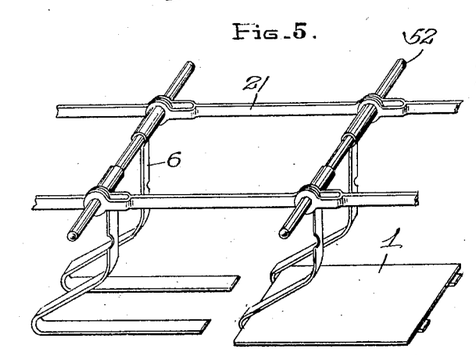
Fig. 5 is an enlarged fragmentary sectional detail of a part of the endless carrier.

Fig. 5 shows a part of the double chain mentioned when dealing with Fig. 1 and, as may be seen, is formed by two simple chains pierced at their joints by bars 52 to which are fastened equal and parallel hooks intended for holding the trays. Said hooks will be separated one from the other in such a way as to permit them to easily pass between the teeth of the peel already described.

Figure 6:
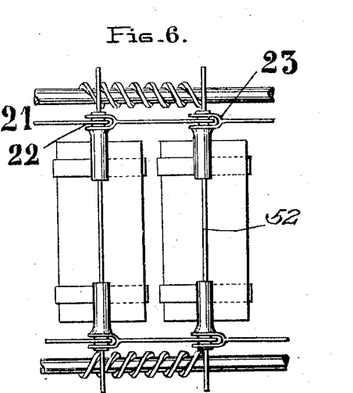
Fig. 6 is a top plan detail thereof showing means for operating the same.

Upon reference to Fig. 6 it will be seen that the simple chains already mentioned are made of cast iron rods 21, finishing at one end in a ring 22 and at the other in a fork with two rings 23. By introducing the ring of a rod in the fork of another and piercing the three rings by a bronze coupler which enters by pressure in the first and with a certain ease in the other two, a perfect chain will be formed the links of which are formed by the said bronze coupler. Therefore, on making these rings, a greater diameter will be given to the second rings than to the first one. In accordance with what has previously been stated, the joints of these chains are pierced by bars 52 which must be cylindrical and have some freedom inside the coupler so that when the temperature rises to about 300 degrees, the same circumstances will continue taking place. To avoid the longitudinal play that these bars would have the caps of the supporting hooks may be extended on one side until there is obtained between the simple chains a separation somewhat greater than the length of the trays or more economically fasten, with pressure screws, caps to both sides of the rings of the fork of the rods after having taken into account the separation to which previous reference has been made. The caps of the supporting hooks will be fastened to the bars by means of rivets or pressure screws.

Figure 7:
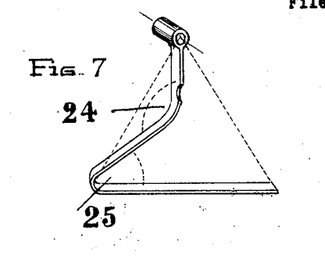
Fig. 7 is a perspective detail of one of the hooks forming a part of the carrier.

The supporting hooks 6 must have the following peculiarities:—They must form, as shown in Fig. 7, an isosceles triangle the side of which is somewhat more than five sixths of the distance from centre to centre of the bars. Its angle 24 must be 135° and angle 25 45° and finally in the metal from which the hook is made between the cap and the vertex of angle 24 there must be a notch as may be seen in the figure.

Figure 8:
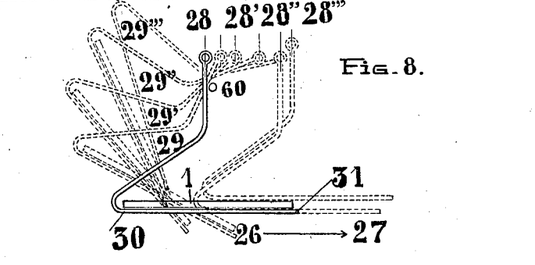
Fig. 8 is an elevational detail of one of the carriers showing in dotted lines the various positions assumed preparatory to discharging the loaves.

Fig. 8 supposes one of these hooks to be animated by a displacement movement 26 27 and on reaching position 29 comes into contact with a raised point 60. The movement nevertheless continues and when the cap of the hook passes from 28 to 28′ the hook will incline taking the position 29′. When the cap passes from 28′ to 28″ the hook will continue inclining until it gets to the position indicated by 29″ and so on until it comes to position 29‴ at which moment the raised point 60 will pass through the notch thereby immediately causing the hook to come back again to its normal position. As is also shown in the same figure, whilst the side 30—31 of the hook has been inclining the tray resting on same has been following the same movement but before the former has regained its normal position the latter will have slid off.

Figures 9, 10, 11:
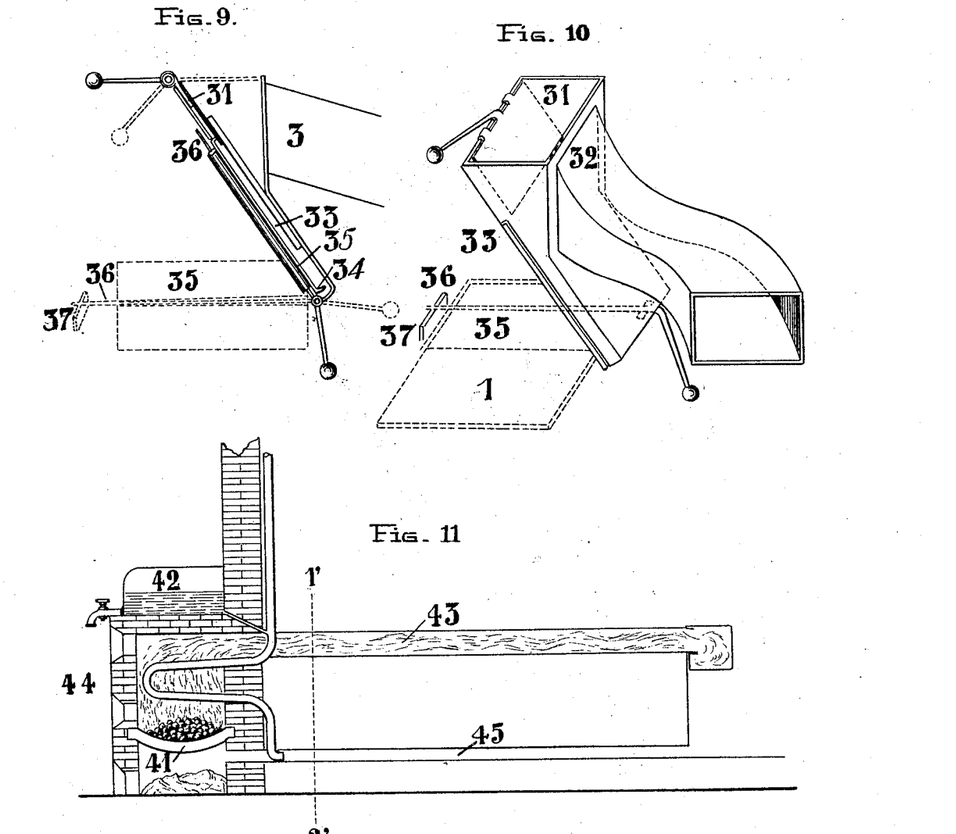
Fig. 9 is an enlarged side elevational detail of the disovening apparatus.
Fig. 10 is a perspective view of the same apparatus in a different position.
Fig. 11 is a fragmentary longitudinal sectional view of the lower portion of the furnace and heating chamber proper.

The disovening or discharging apparatus consists of a hopper closed at the top by a lid 31 which has a counterweight. The front face of the hopper communicates with a tube 32 of rectangular section, shorter in length than that of the trays on purpose to prevent these from passing through and therefore these trays are forced to continue slipping along the hopper until they are introduced into 33 the narrowness of which will not allow any of the loaves to pass and, as a consequence, they fall outside after passing through said tube 32. The unloaded tray now introduced into 33 will slip along until it comes into contact with ledge 34 of tin plate 35 when it immediately releases the lid 31, and this, by its own counterweight, will shut the hopper. The tray will now solely move on tin plate 35 weighing it down by reason of the hinges by which the tin plate is fastened at one end until rod 36 comes into contact with raised point 37 when the plate 35, through being able to turn around it, will incline towards one side thereby causing the tray to fall outside. This disovening apparatus will be placed under the raised points mentioned when dealing with Fig. 7, said raised points to be positioned in such a way as will permit the supporting hooks to come into contact with them before the bars of the double chain are detached from the lower pair of screws.

The double chain having already been described when dealing with Figs. 5 and 6, the arrangement of the endless screws, shown by 7 in Fig. 1, must now be explained as the chain movement will be produced by them.

As will be seen from Fig. 1, the four endless screws will be placed on a parallel plane and very near to each one of the lateral walls of the baking chamber. This will have to be done in such a way that each one of the four screws of each wall be parallel to the other on the opposite side of the wall. They must also be on the same horizontal plane, their threads or worms must be reversed, the rotation of their axles must also be contrary and each one of their similar points must have a common perpendicular. Hereinafter each two of these screws having the peculiarities described above will be called a pair of screws. The apparatus will therefore have four pairs of screws viz: the bottom pair, the lower central pair, the higher central pair and the top pair. It is also advisable for explanations which will later follow to call a set of screws those placed near the side of each wall and therefore the apparatus will be composed of two sets.

The screws of the top and bottom pairs will, by one of their ends, rest on the back wall of the apparatus and the others will go through the front wall and clamp into a wheel. These wheels will engage or clog into others which are fastened to vertical shafts the rotary movement of which will be transmitted to the top and bottom pairs of screws and also to the central pairs through their also having one end fastened in the way we have just described. The opposite ends of the central screws will be fixed to the lateral walls by means of appropriate brackets or bearing brasses.

The distance between the screws of each pair must be such as will permit the double chain to freely pass between them and only the ends of the bars of said chain, the part which pierces the joints, should rest on the axles of the screws as may clearly be seen on Fig. 8.

The length of the axles of the screws will be determined by the separation between the front and back walls of the chamber. The separation must be approximately two sevenths of the total length of the double chain which, as regards itself, may be of any length providing the links are a multiple number of four and above eight. The separation which would be obtained between the walls, in the way set forth, implies that the length of the central screws inside the chamber will be equal to the total of so many times the distance from center to center of the bars of the double chain as the number of its links less eight contains four, plus a distance. For instance, in Fig. 1 the length of the axle of a central screw will be, in accordance with what has just been said, $$\frac{20-8}{4}+1=\frac{12}{4}+1=3+1=4$$

distances from center to center of the bars.

Another detail of absolute necessity when placing the screws is that these should keep between each other the following distances in any of the sets:—Between the bottom and the lower central pair as between the higher central pair and the top one, there will be an equal distance as from bar to bar, plus twice the diameter of these plus a prudent excess for free movement and to counteract the expansion of the material to about 300° of temperature. Between the axles of the central screws there should be a distance equal to that from bar to bar, less the diameter of said axles.

The following are also essential parts of the apparatus:—the guiders 9 shown on Fig. 1 the object of which is to support the double chain when this does not directly rest on the axles of the screws and to guide it in the other cases. These guiders must be arranged in such a way that the plane on which are those of each set is between the plane of the screws and the wall. As may be seen from Fig. 1, these guiders form a closed line the under and top sides of which are not completely parallel in all their length. The object of this is to cause the bars of the double chain on reaching point 39, to go down gently and to always maintain somewhat of a curve in the descending links, detail which is advisable for the better working of the apparatus.

Finally the vertical axles 8 of Fig. 1 are joined together by means of chains or toothed wheels so that when one of them moves, driven by pinion 40, the other moves at the same speed but with a contrary rotation.

The operation of the double chain may easily be understood by examining Fig. 1 as it is unquestionable that when the apparatus is operating in the direction indicated by the arrows, the threads of the bottom pair of screws will draw some of the bars of the double chain towards the mouth of the chamber and, seeing that before any of these bars have left the threads, the following bar will have become engaged therein, the double chain will always be driven along by said screws in the said direction. Seeing that, at the same time, the threads of the lower central pair are driving in the opposite direction to the other bars of the double chain, it will result that one of the intermediary bars of the bottom pair will be on the said lower central pair whereas the rods united by this intermediary bar will be in a straight line or form an obtuse angle but as soon as this angle gets reduced to less than ninety degrees, the bar will be compelled to let go of the said bottom pair and will continue rising until it gets between the axles of the lower central pair and the immediate guider, its movement going on in the opposite direction to that it was following when resting on the bottom pair. By similar reasoning, the bar thus placed under the lower central pair will get placed on the axles of the higher central pair and later between the top pair and its guiders. The descent from the top to the bottom pair is evident as on account of the distance from the part of line or guider corresponding to the former down to the latter being less than the length of the double descending chain, the chain will always remain outside the curve of the guider.

The heating apparatus includes a furnace consisting of a fire brick walled box at the front of which there will be several doors placed, of course, on the grating 41 for the purpose of putting fuel in and others for cleaning out the ashes. There will also be windows, usually closed, which, on account of there being one before each smoke conductor, will be utilized for cleaning such smoke conductors. On top of the fire-box there will be a boiler 42 provided with a tap so as to have warm water for kneading purposes at any time. No. 43 shows one of the smoke conductors. Inside the fire box the double elbow of a tub may be seen, the lower end of which comes out in gallery 45 and the top end terminates inside the chamber as may be seen in Fig. 1.

Figures 12, 14:
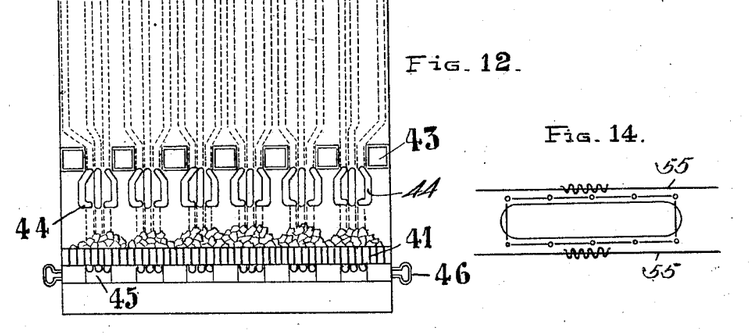
Fig. 12 is a transverse sectional view of the same.
Fig. 14 is a diagrammatic detail of the modified arrangement of the carrier.

Upon reference to Fig. 12, No. 43 shows the smoke conductors, 44 the double elbows of the tubes; 41 the grating; 45 the galleries and 46 a sliding door capable of closing, entirely or not so, and at the same time, all the galleries 45. As shown in the figure, these tubes go through the wall together just between each two smoke conductors and are separated, both inside the furnace and in the chamber, in the shape of a fan.

Figure 13:
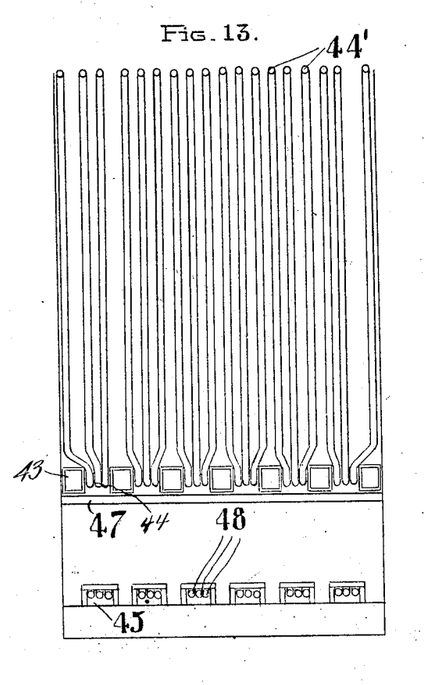
Fig. 13 is an elevational detail of the heating apparatus viewed from the side of the chamber.

As shown in Fig. 13, 47 is a bed of sand on which are placed the smoke conductors 43 which may be round. In the bottom part of the bed, the galleries, similar to sewers, are formed and in these appear the mouths 48 of the tubes 44 of Fig. 11.

As may be seen in Figure 1, the smoke conductors extend up to the site on which the disovening apparatus is placed and all of them terminate in one big conductor 48' which collects and lets out what is thrown off by the fuel, carrying to other lateral conductors which in turn communicate with the chimney.

The operation of the heating system is as follows:—Once the fire is kindled the fuel doors will be hermetically closed and some of the ash doors opened that is if it is desirable that the necessary air for combustion come from outside but if it is more advisable to take the air from inside the chamber, the ash doors would be closed and the galleries 45 opened, pulling out the sliding door mentioned when dealing with Fig. 12. By either of these two methods the kindling of the fuel may be obtained and it is unquestionable that once the fuel is ignited its flames will travel from all parts of the grating to the mouths of conductors 43. On their way towards these conductors, the flames will reach tubes 44 and greatly heat them but, naturally, a certain number of the calories given off by the burning of the coal will be consumed but nevertheless the flames and smoke will enter the conductors still containing a great part of the heat produced by the combustion. This will bring about an increase in the temperature of the walls of said conductors, a great portion of which heat will then pass into the chamber.

In addition, as has already been stated, tubes 44 have one end in the galleries 45 and the other inside the chamber. Therefore, bearing in mind that part 44 of these tubes is constantly wrapped in flames, the air from this part of the tubes will decrease in density as its molecules increase in volume by reason of the heat they have undergone and, as a consequence, an upward rising air draught will be produced which, entering the tubes by the mouths situated in galleries 45 will come out, after being heated in the double elbows, through the mouths inside the chamber which are marked by 44' in Fig. 13.

The working of the automatic oven for continuous bread baking, the features of which have already been described is as follows:— If it is supposed that the apparatus which, as a whole, is drawn on Fig. 1, is bricked in with refractory material for preventing the heat of the chamber from escaping, taking care that the temperature is even, state that may be obtained by the stoker following out the indications of a pirometer which would be placed in his sight, the dough baking can begin.

The dough bearing trays will be brought along one after the other to the ovening table, making use of the rail running from the kneading place for this purpose. The workman charged with the ovening will begin by hanging the ballast on the bar attached to the stem of the peel there causing the door of the oven to rise. The workman will then immediately turn the handle until the first tray is put on the peel after which the door will again close in spite of the ballast which opened it on account of the tray and dough being heavier than the ballast. The apparatus will then be clutched into an electric motor capable of generating the necessary power for moving it and, making use either of a gear box or interposing a suitable set of pinions, this motor will transmit to the screws a speed which should be such that in order to cover $1/n$ of the length of the double chain ($n$ being the number of trays the chain is capable of bearing) the tray placed on the supporting hooks will take $x/n$ minutes ($x$ being the time in minutes needed for the dough to be baked and for a given temperature). Arranged in this way we may be sure when the first $x/n$ minutes have passed, the tray which was placed on the peel will have been picked up by the hooks, thereby causing the raising of the door, when the workman will introduce the second tray which will also be caught up by other hooks in $x/n$ minutes, the opening and closing of the door being repeated in each case. Continuing in this way it is unquestionable that the moment for introducing tray number $n$ will arrive (Fig. 1) when the first tray introduced will be thrown from its hooks on coming into contact with the raised point already dealt with, and these hooks will then be free and ready to receive tray No. $n+1$. In the same way, the falling of the second tray introduced will leave its corresponding hooks free for receiving tray $n+1$ and so on as long as there are trays in the kneading room and the first has been kept going. When all the dough has been dealt with or if it is desirable to suspend baking operations, the ballast will be taken away and at the same time, the door will close but the apparatus continue to operate until the tray which was put in last has been thrown out.

Figure 15:
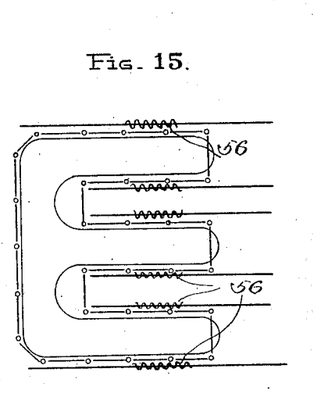
Fig. 15 is a diagrammatic detail of still another arrangement for operating the carrier.
Figure 16:
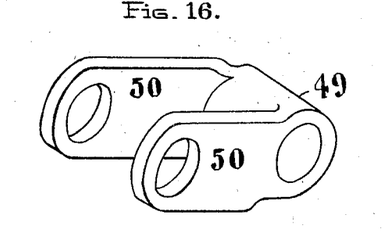
Fig. 16 is a perspective view of a portion of the endless chain.
Figure 17:
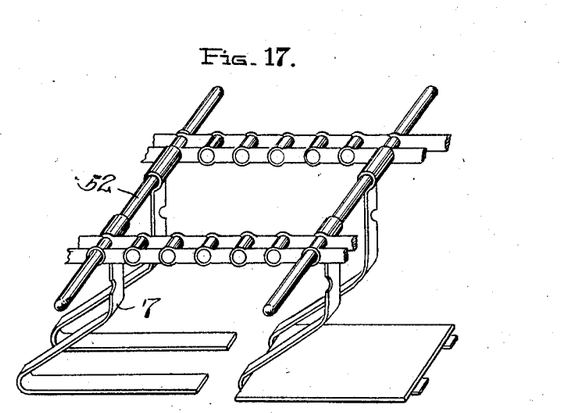
Fig. 17 is a perspective view of a slightly modified form of the invention.
Figure 18:
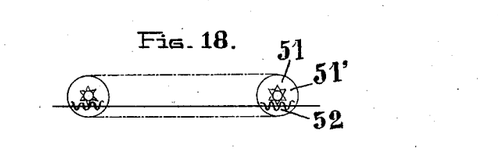
Fig. 18 is a diagrammatic detail of another means for operating the modified form of carrier.

Everything that has been explained refers to an automatic oven in which the endless chain is driven by two sets of four endless screws but the oven can be built with sets of two screws as at 55 in Fig. 14, of four as already described, of six as shown at 56 in Fig. 15 and of six plus any number pair of screws by simple arranging the sets in an analogous manner and in the form indicated in Fig. 15, increasing by two central pairs for each two by which the set is increased. The endless screws can also be replaced by toothed wheels and, in this case, the double chain to be used would differ from the one already described. In the second case it would also be formed by two chains exactly equal but its links would have to be cast and would be shaped as shown in Fig. 16 in which a cap 49 may be seen from which protrude two little wings or teeth 50 which are separated to allow the cap of another link to enter with ease. Both the cap and the teeth are bored so that when the links are joined up their union may be secured by introducing in the holes of each two wings and cap a bronze coupler similar to the one described in a similar case. This coupler should enter by pressure in the cap and freely in the teeth so that when the temperature rises to 300° it will be imprisoned in the former and serve as a link pin in the latter. The bars 52 easily pass through the inside of this coupler and their longitudinal play is prevented in the same way as in the double chain for screws. In Fig. 17 a piece of the double chain just described may be seen. In arranging the toothed wheels of the double chains the wheels are arranged in sets of two and are fixed like those appearing in Fig. 18, properly separated in accordance with the length of the double chain. Parallel to these wheels will be fixed two other wheels also separated from each other and distanced from the first two in accordance with what is permitted by the distance between similar links pierced by the bars. The links will engage in the wheels 51 and when all the wheels move in the same sense driven by pinions 51' which are fastened to them and which in their turn engage in the screws 52, the double chain will revolve, describing a closed line.

*By sets of five toothed wheels.*—This case is the most suitable for the construction of an oven with wheels for which reason it is shown in Fig. 20 from which may be seen the way in which the five wheels of each set must be arranged. The working is simple as wheels 51, 51' forming one piece or being invariably joined, when the apparatus is started, screws 52 (which may be either inside or outside the chamber, fastened, of course, to pinion 51') will transmit a revolving motion to the pinions 51' and these in their turn to wheels 50 which will, in their movements, pull along the chain into which they are engaged and as all the wheels go at the same speed and are engaged in the links of the double chain, the latter will move continuously following the closed line as may be seen in said figure. For this case it is advisable to leave the central wheels free.

Figure 19:
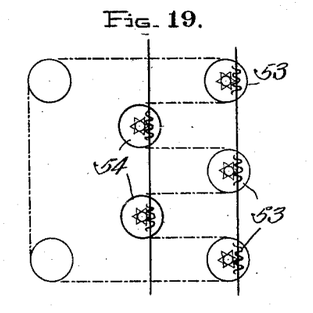
Fig. 19 is a similar view of a still further arrangement of the same.

*For a set of six or six plus two toothed wheels.*—The arrangement of the wheels will be similar to the previous case, only changing in such a way as instead of one there will be two central wheels, three on the right and the remaining two on the left as shown at 53 in Fig. 19, this for each set and for the case in which these are of six Fig. 19, since for cases of $7 \times 2n$ wheels it will be necessary to increase $n$ central wheels and others $n$ to the right in each set. In these cases it is advisable to leave the wheels 54 of the left free and move the others by means of two vertical shafts for each set as is indicated in Fig. 19.

It is believed in view of the foregoing that a further detailed description of the invention is entirely unnecessary. Likewise it is believed that the application of the invention will be readily apparent.

Having thus fully described the invention what is claimed as new and desired to be secured by Letters Patent is:—

1. An oven for baking loaves of bread and the like, including a heating chamber, an endless tray carrier operating within the chamber, an ovening table communicating with the chamber, automatic tray transferring mechanism between the table and carrier, automatic discharging mechanism for the trays including means for tipping the trays, means for separating the loaves from the trays, and means for separately discharging the loaves and the trays.

2. An oven for baking loaves of bread and the like, including a heating chamber provided with a door opening, a door slidably associated with said opening, an endless tray carrier operating within the chamber, an ovening table communicating with the chamber, automatic tray transferring mechanism between the table and carrier including a pivotally mounted weight operable peel and an operable connection between the peel and the door, and means for automatically discharging the trays.

3. An oven for baking loaves of bread and the like, a heating chamber, an endless tray carrier operating within the chamber including opposed endless linked chains, rods connecting the chains transversely and extending beyond the same, hook-like carriers suspended from the rods, means for guiding the rods, a plurality of shafts rotatably mounted horizontally of the chamber, screws carried by the shafts and engaging the rods so as to impart movement to the chains, and means for operating said shafts synchronously.

4. An oven for baking loaves of bread and the like, including a heating chamber, an endless tray carrier embodying a plurality of hook-shaped members having flat tray supporting bills, an ovening table communicating with the chamber, automatic tray transferring mechanism between the table and carrier including a pivotally mounted fork-shaped weight operable peel through the forked arms of which the hooks pass so as to pick up a tray when the peel is lowered into the path of hook-like members.

5. An oven as claimed in claim 1, wherein the tray carrier includes linked chains, rods connecting the opposed links of said chains, tray carrying hooks pivotally suspended from the rods for coacting with the tray transferring mechanism and the discharge mechanism, guides within the chamber for the rods, and means for imparting movement to the chains.

6. An oven for baking loaves of bread and the like, including a heating chamber, means for confining and circulating products of combustion through the lower part of the chamber, means for introducing hot air within the upper part of the chamber, an endless tray carrier operating within the chamber, means for operating the carrier at a regulable speed to ensure of the proper baking of the dough on the trays during a single cycle of the carrier, an ovening table communicating with the chamber, automatic tray transferring mechanism between the table and carrier and automatic discharging mechanism for the trays including means for tipping the trays, means for separating the loaves from the trays, and means for separately discharging the loaves and the trays.

In testimony whereof I affix my signature.

FORTUNATO FERNANDEZ OVIEDO.